Patented Dec. 20, 1938

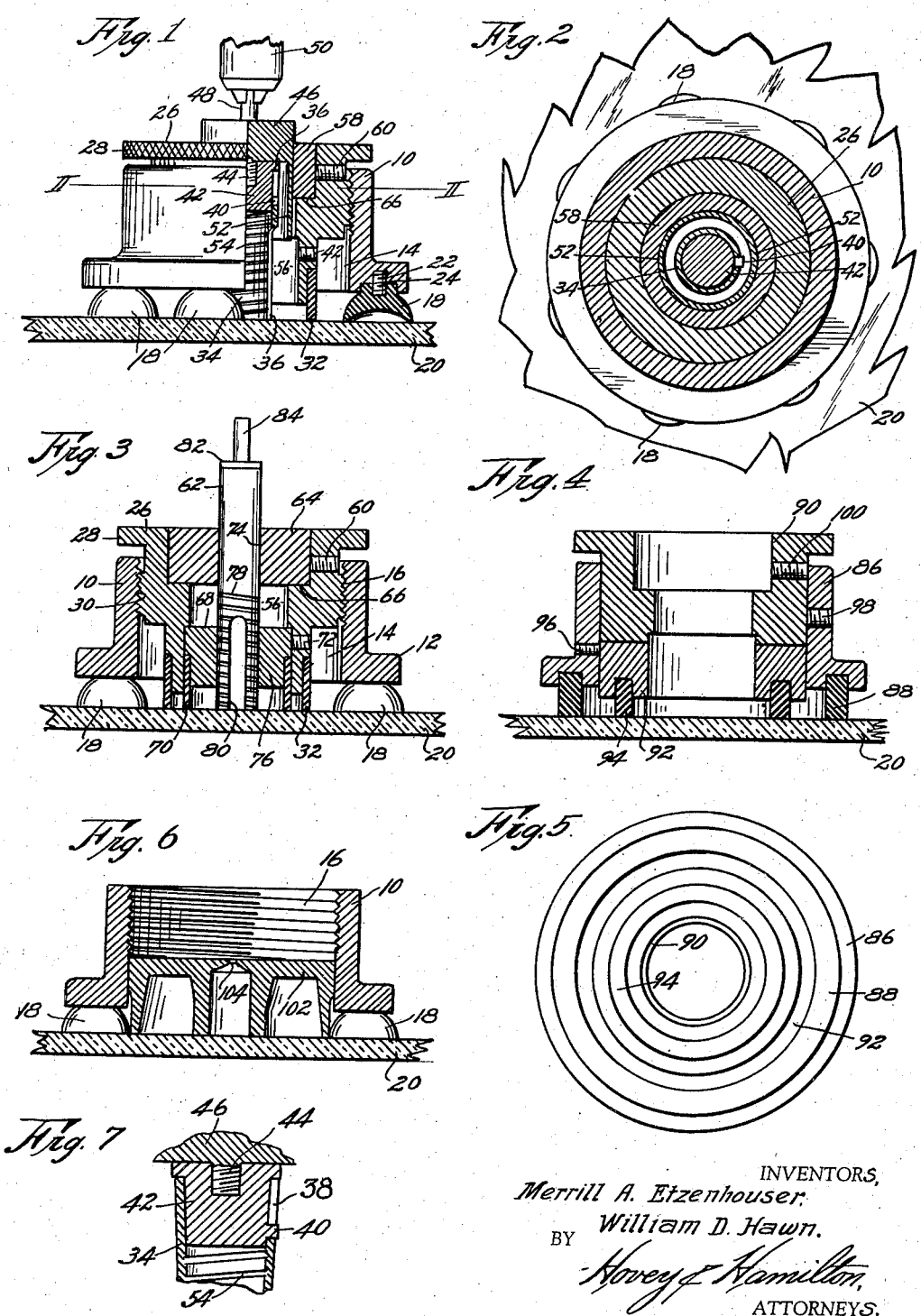

2,140,901

UNITED STATES PATENT OFFICE 2,140,901

CUTTING DEVICE

Merrill A. Etzenhouser and William D. Hawn, Independence, Mo.; said Hawn assignor to said Etzenhouser Application March 6, 1936, Serial No. 67,473

11 Claims. (Cl. 125—20)

This invention relates to cutting devices and specifically that type of tool employed in the forming of cavities or holes in such materials as glass, marble, stone and other elements of a non-fibrous nature where it becomes necessary to remove a core to form the aforesaid opening, rather than to remove the material in the form of shavings, chips or the like.

The primary object of this invention is the provision of a cutting device of the aforementioned character, that has a number of useful and uniquely assembled parts so that not only is the construction of the tool made simple and inexpensive, but its employment is advantageous in that the same is easily attached to the face of the material being acted upon; will effectively confine liquid and abrading material within a circumscribed area at the zone of cutting; may be quickly adjusted with respect to the size of cutter employed; and is otherwise specially formed to meet a wide range of requirements without complicated parts and mechanism.

Minor objects of the invention, including specific structural details and relation of parts will become apparent during the course of the following specification, referring to the accompanying drawing, wherein the invention is exemplified in a number of forms.

In the drawing:

Figure 1 is a vertical, partial central section through a cutting device embodying the present invention.

Fig. 2 is a horizontal cross section through the same, taken on line II—II of Fig. 1.

Fig. 3 is a vertical, horizontal section through the device, with a different form of cutter inserted therein.

Fig. 4 is a similar sectional view with another form of the device, but with the cutter entirely removed therefrom.

Fig. 5 is an inverted plan view of the form of cutter illustrated in Fig. 4.

Fig. 6 is a vertical, central section through the holder of the device, showing the center finder in place, and, Fig. 7 is an enlarged, fragmentary, sectional view through the head which holds the tubular cutter in place.

When constructing a cutting tool of the character which is to embody this invention, holder 10 may be cast or otherwise formed to have an out-turned annular flange 12 extending around the base thereof and a central bore 14 provided therethrough. The inner face of the wall of holder 12 should be provided with screwthreads 16 and a series of gripping elements in the form of suction cups 18 are adapted to the lower face of holder 10. These suction cups are of the conventional type, and while seven have been illustrated herein as a set number, the distance apart of elements 18 may be varied so as to provide a greater or lesser number, all to the end that sufficient gripping force is established to positively secure the holder upon the surface of work 20 which, in this instance, is a sheet of plate glass through which an opening is to be cut.

Each element 18 may be provided with a screwthreaded shank 22 that fits into a screwthreaded socket 24 so that when the rubber of elements 18 is worn, the same may be replaced.

An insert 26, having an annular, overhanging rim 28, is formed of metal and provided with external screwthreads 30 which engage threads 16 so that insert 26 may be moved within bore 14 toward and from work 20. The lower annular edge of insert 26 holds a resilient skirt 32 that sets off an area on the surface of work 20. It is important that elements 18 hold the entire device in place as insert 26 forces skirt 32 against the surface of work 20 to an amount ample to create a water-tight joint.

The form of cutter 34 illustrated in Fig. 1 is substantiallly the same form that may be utilized with the device shown in Fig. 3. Referring to Fig. 1, cutter 34 is tubular, has a series of notches 36 extending inwardly from one end thereof and a single notch 38 extending inwardly from the other end thereof. The latter notch 38 receives pin 40 integral with head 42, which in turn is screwthreaded onto shank 44 of member 46. Member 46 has a tool-engaging neck 48 that may be gripped by any suitable chuck 50 to the end that cutter 34 may be rotated. Member 46 has an annular, depending skirt 52 that serves to return any abrasive or liquid that might creep to the top of cutter 34. In order to prevent such creeping however, cutter 34 is provided with spiral grooves 54, both on the inner and outer surfaces thereof and these spiral grooves 54 have leads toward the cutting end of cutter 34.

To insure that tubular cutter 34 will remain in place on head 42, the latter is tapered as illustrated in Fig. 7 so that as it enters cutter 34, a positive gripping action occurs that is accentuated throughout the time the device is in operation.

An opening 56 of irregular form is provided through insert 26 so that the aforementioned parts may be combined therewith and when cutters of different sizes are desired, provision is made for their being held merely by interchanging the bushing 58 that is held in place by set screw 60. Reference to Fig. 3 readily teaches how a smaller cutter 62 may be used with the standard holder and insert 10 and 26 respectively. A larger bushing 64 is merely moved into opening 56 to rest upon shoulder 66 and a reducer 68 with a skirt 70 formed of rubber or other suitable resilient material is inserted into opening 56 at the other end of insert 26.

A set screw 72 is moved to place against reducer 68 and then cutter 62 is extended through aligned openings 74 and 76 of bushing and reducer 64 and 68 respectively. Cutter 62, like cutter 34, has spiral grooves 78 formed therein with a down lead and notches 80 are provided at the work-engaging end thereof. A head 82, having a neck 84, serves to interconnect cutter 62 and any suitable connection to a source of power.

Another manner of constructing the body portions of the cutting device is illustrated in Fig. 4. In the form therein shown, holder 86 is provided with a sponge rubber ring 88 to engage work 20 and insert 90 does not hold the annular resilient skirt as in the form illustrated in Fig. 1. A retainer 92, having a sponge rubber annulus 94 is set into the bore formed through holder 86 and there retained in place by set screw 96. A set screw 98 affixes insert 90 in the proper position and set screw 100 is used like set screw 60 when it is determined what type of cutter is to be employed. This form of cutting device body is particularly useful in holding the cutter in operative position upon irregular and undulated surfaces. The sponge rubber members 88 and 94 will distort to conform to the surface engaged.

Center finder 102, having a peep hole 104 formed therethrough is an important part of this device and the manner of using the center finder becomes apparent when observing Fig. 6. When the center of the opening to be cut is marked upon the face of work 20, center finder 102 is set upon the work with peep hole 104 in register above the marked center and then holder 10 moved down over the center finder. When elements 18 have gripped the work, center finder 102 is removed and the other parts of the cutting tool are then brought into play and association with the affixed holder.

It is understood that a number of changes and modifications other than those illustrated and described might be made without departing from the spirit of the invention and scope of the appended claims.

Having thus described the invention, what is claimed as new and desired to be secured by Letters Patent is:

1. In a cutting device of the kind described, a holder provided with a bore therethrough; resilient means on the holder for securing the holder in place upon the surface of the work; and a center finder having a peep-hole formed therethrough movable to and from a position in the bore of the holder for the purpose specified.

2. As a new article of manufacture, a center finder for a cutting device having a holder provided with a bore therethrough comprising a disc-shaped element, having a diameter substantially the same as the diameter of the bore of the holder, and a peep-hole therethrough at the center of the disc and on the axis of the bore through the holder when the element is in position therein.

3. In a cutting device of the kind described, a holder provided with a bore therethrough; an insert having an opening therethrough positioned in the bore of the holder; screwthreads formed on said holder and insert for adjustably securing the two together; suction cups on the holder for securing the same to the surface of the work; a reducer positioned in the insert; and a resilient skirt on the reducer for engaging the surface of the work to set off an area on the same.

4. In a cutting device of the kind described, a holder having means for securing the same to the face of the work; and a rotatable cutter journalled in said holder, said cutter comprising a member having an annular depending wall, a head in screwthreaded engagement with said member and a tubular cutter having one end telescoped over said head.

5. In a cutting device of the kind described, a holder having means for securing the same to the face of the work; and a rotatable cutter journalled in said holder, said cutter comprising a member having an annular depending wall, a head in screwthreaded engagement with said member and a tubular cutter having one end telescoped over said head, said tubular cutter having a series of notches extending inwardly from the other end thereof.

6. In a cutting device of the kind described, a holder having means for securing the same to the face of the work; and a rotatable cutter journalled in said holder, said cutter comprising a member having an annular depending wall, a head in screwthreaded engagement with said member and a tubular cutter having one end telescoped over said head, the portion of said head extending into said tubular cutter being tapered to provide a tight fit between said head and cutter.

7. In a cutting device of the kind described, a holder having means for securing the same to the face of the work; and a rotatable cutter journalled in said holder, said cutter comprising a member having an annular depending wall, a head in screwthreaded engagement with said member and a tubular cutter having one end telescoped over said head, said head having a radially extending pin integral therewith, said cutter having a notch formed inwardly from the said one end thereof to receive the pin to prevent relative rotation between the head and cutter.

8. In a cutting device of the kind described, a holder having means for securing the same to the face of the work; and a rotatable cutter journalled in said holder, said cutter comprising a member having an annular depending wall, a head in screwthreaded engagement with said member and a tubular cutter having one end telescoped over said head, the portion of said head extending into said tubular cutter being tapered and having a radially extending pin integral therewith, said cutter having a notch formed inwardly from the said one end thereof to receive the pin.

9. As a new article of manufacture, a cutter for cutting devices of the kind described comprising a tubular member having a series of notches extending longitudinally inwardly from one end thereof; and a single continuous spiral groove formed along the inner and outer faces respectively of said member, said grooves having leads toward the end of said member having the notches formed therein, said notches being deep enough to intersect a number of the turns of the continuous spiral grooves.

10. In a cutting device of the kind described, a holder having means for securing the same to the face of the work; a rotatable cutter journalled in said holder, said cutter comprising a member provided with an annular depending wall, means carried by said member for removably retaining a cutter of selected, desired diameter, said selected cutters being circumscribed by the annular depending wall when retained in place.

11. In a cutting device of the kind described, a holder provided with a bore therethrough; an insert having an opening therethrough positioned in the bore of the holder; suction cups on the holder for securing the same to the surface of the work; a reducer positioned in the insert; and a resilient skirt on the reducer for engaging the surface of the work to set off an area on the same.

MERRILL A. ETZENHOUSER.
WILLIAM D. HAWN.